June 4, 1963     F. REINHARDT ET AL     3,091,902
METHOD AND DEVICE FOR FABRICATING BAG PACKAGES
Filed April 14, 1960     3 Sheets-Sheet 3

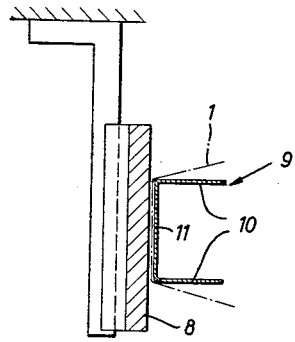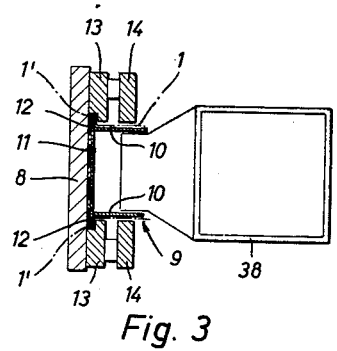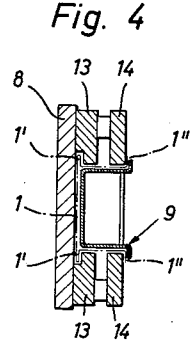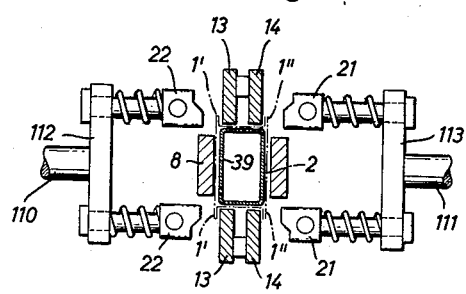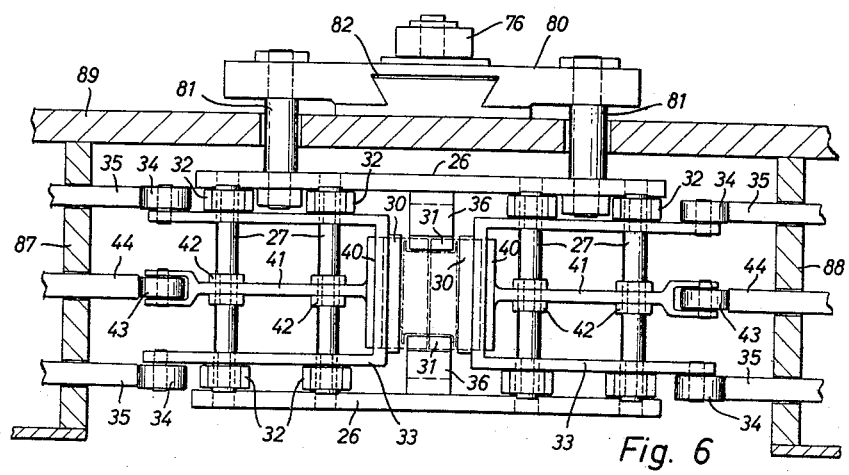

United States Patent Office 3,091,902
Patented June 4, 1963

3,091,902
METHOD AND DEVICE FOR FABRICATING BAG PACKAGES
Fritz Reinhardt, Schweichelm-Bermbeck uber Herford, Westphalia, and Alfred Gräfingholt, Stuttgart-Bad Cannstatt, Germany, assignors to Firma Fr. Hesser Maschinenfabrik - Aktiengesellschaft, Stuttgart - Bad Cannstatt, Germany, a corporation of Germany
Filed Apr. 14, 1960, Ser. No. 22,384
Claims priority, application Germany Apr. 17, 1959
10 Claims. (Cl. 53—28)

This invention relates to devices of the type employed for fabricating bag packages and in which a tube is formed around a mandrel from at least one heat sealable web, and in which means are provided for drawing the web and the tube formed therefrom over a mandrel and to divide the tube into individual packages by the application of transverse heat sealing seams.

It is an essential feature of our invention that the means for drawing the tube forward over the mandrel are arranged in such a way that the points at which the said drawing means engage the tube are located substantially in the plane of the outer surface of the mandrel which determines the cross section of the tube.

In one particular embodiment of the invention, a plurality of suitable grippers or clamping jaws are displaceably mounted directly alongside the mandrel or in axial extension of the outer surface of the same, said grippers or jaws being adapted, during the forward draw, to engage a tube, which is preferably formed into a rectangular cross section, at ribbed edges with which this tube is provided.

Figure 1:
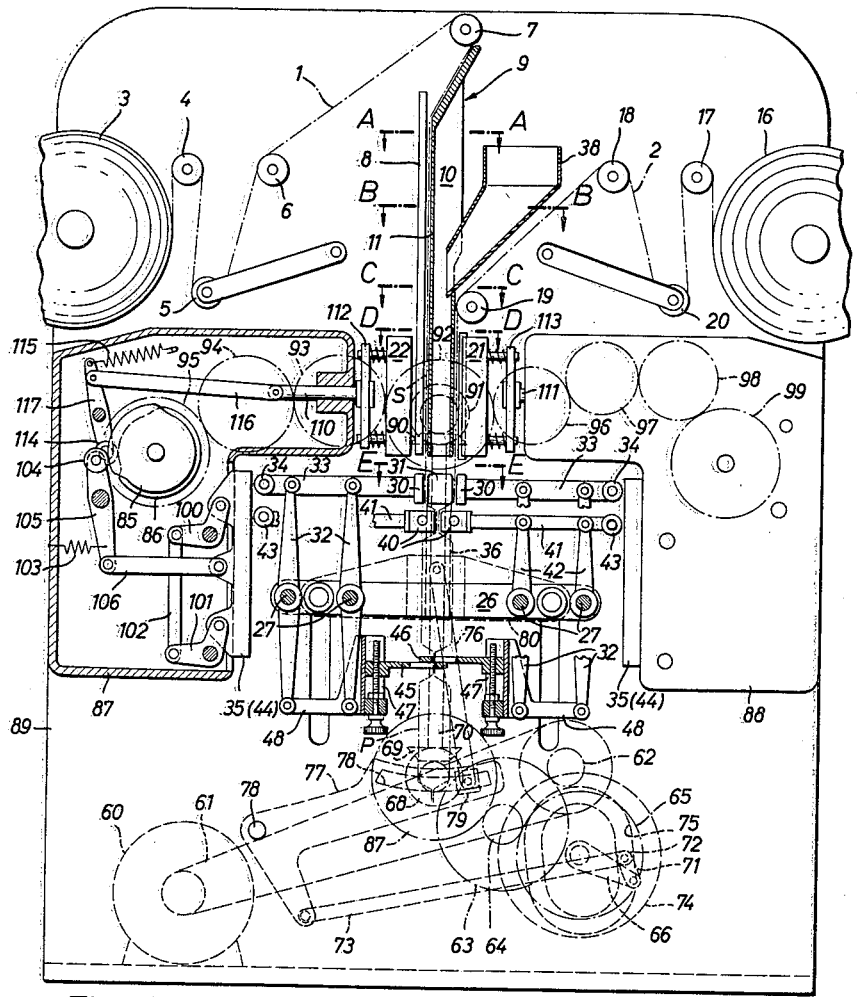
Figure 7:
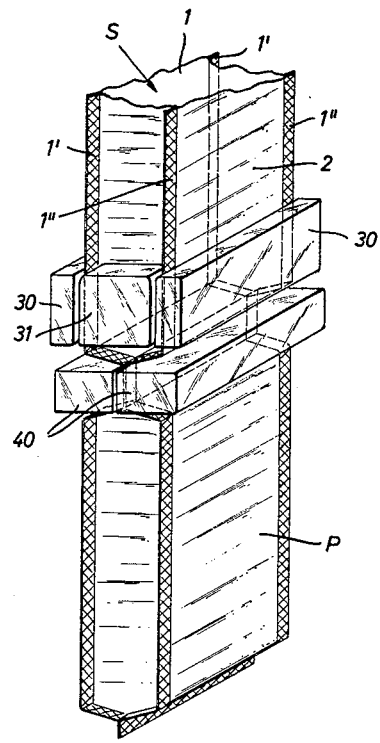
Figure 8:
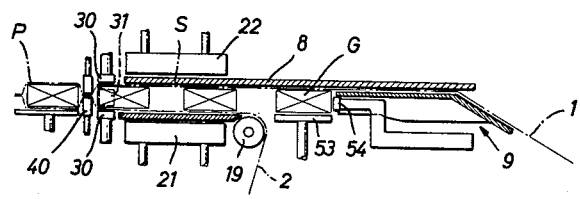

Embodiments of this invention are illustrated in the accompanying drawings, in which:

FIGURE 1 is a front elevation, partly in section, of a vertically operating embodiment of the device for fabricating bag packages, FIGURE 2 is a cross-section on line A—A of FIGURE 1, on an enlarged scale, FIGURE 3 is a cross-section on line B—B of FIGURE 1, on an enlarged scale, FIGURE 4 is a cross-section on line C—C of FIGURE 1 on an enlarged scale, FIGURE 5 is a cross-section on line D—D of FIGURE 1, on an enlarged scale, FIGURE 6 is a cross-section on line E—E of FIGURE 1, on an enlarged scale, FIGURE 7 is a diagrammatic illustration of clamping jaws and heat sealing jaws used in the device according to FIGURE 1, FIGURE 8 illustrates a horizontally operating embodiment of the device.

In the embodiment of the invention illustrated in FIGURES 1-7, the packages P are made from two webs 1 and 2. The web 1 runs from a reel 3 over a reversing roller 4, a jockey roller 5, and then over two further rollers 6 and 7. Thence the web is conducted between a flat member or bar 8 and a shaping plate 9 so as to form, firstly, a U-shaped part in the bag tubing (FIGURE 2).

To give the U-shaped part folded edges 1' reinforced in ribbed fashion, the freely outstanding limbs 10 of the shaping plate 9 are so arranged that the spacing between the limbs 10 is decreasing in the direction of forward travel of the web 1. The fact that, on the other hand, the connecting web 11 of the shaping plate 9 is of uniform width, means that this plate 9 has two ribs 12 of progressively increasing size (FIGURE 3).

The web 1 is folded around these ribs 12 by fixed folding members or backing members 13, 14 conforming with the above-described contour of the shaping plate, and pressed flat, so that after a specific length of travel of the web, the ribs 12 become unnecessary. From about this point onwards, the outer edges of the limbs 10 of the shaping plate 9 are gradually offset outwards to a final angle of 90°, whereby the margins 1" of the web 1 are likewise turned through 90° over the folding members 14 (FIGURE 4). The tube is now completed by heat sealing upon the turned over margins 1" a web 2 which is supplied from a supply reel 16 over deflecting rollers 17, 18, 19 and an interposed jockey roller 20.

Two vertically arranged heating jaws 21 are used as the sealing tools. At the same time the folded edges or fins 1' of the web 1 are welded by means of further vertically arranged heating jaws 22, the fixed folding members 13, 14 in both instances being used as counter jaws (FIGURE 5).

The tube or sleeve S is formed from the webs 1 and 2 in stages, and in each case by the drawing of the tube forward through the agency of a clamping device, which reciprocates up and down together with a transverse sealing device. These two devices are arranged on a frame constituted by lateral bearers 26 and transverse spindles 27, FIGURE 6, this frame being moved up and down in rhythm with the operation of the device.

In more detail, the clamping and transporting device comprises two opposed clamping jaws 30 and two counter pressure blocks 31 which are provided between the jaws 30 and the folding edges 1' and 1" of the tube or sleeve S, see FIGURE 7. As illustrated in FIGURE 6, the clamping jaws 30 are secured to forked carriers 33 which form parallelogram guides with levers 32 which are rotatably mounted on carriers 33 and on the transverse spindles 27. Rollers 34 are mounted on the limbs of the carriers 33 and these run on reciprocated rails 35 to control the clamping movement of the clamping jaws 30. Each of the counter members or pressure blocks 31 is secured to an extension piece 36 which, in turn, is fixed on the side bearers 26.

In the forward pull of the tube S, the clamping jaws 30 are moved towards one another in the upper position of the clamping device by operation of the rails 35 and firmly clamp the folding edges 1', 1" of the tube or sleeve S under the counter pressure of the blocks 31 (FIGURE 7), and the clamping device is then pulled down a specific distance corresponding to the dimension of the package P.

The separation of the tube into individual packages P is performed by means of the heat sealing device by applying a transverse seam after each charging of the contents into a package from a filling hopper 38 which opens into the shaping plate 9 which, from here onwards, is in the form of a hollow mandrel 39. Reference is directed to the fact that a filling height which is comparatively short in relation to the usual devices of this character is secured in this apparatus because the filling hopper 38 can be arranged directly above the roller 19 for deflecting the web 2.

In more detail, the heat sealing device comprises, as illustrated in FIGURE 6, heating jaws 40 attached to levers 41. These levers 41 together with levers 42 which are mounted rotatably on the transverse spindles 27 form parallelogram guides for the heating jaws 40. Mounted on the ends of the levers 41 opposite the heating jaws 40 are rollers 43 which bear against reciprocable rails 44, FIG. 1.

Knives 45, 46 for separating the individual packages P are adjustably arranged beneath the heating jaws 40 at a spacing of one package length, with their cutting edges disposed in recesses. The knives 45, 46 are moved in guides 47 mounted on levers 48. These levers 48 are arranged on the lower ends of the levers 32 so that the separation of a package P occurs simultaneously with the clamping movement of jaws 30.

The tube formed from the webs 1 and 2 may also be formed in a horizontal plane, as illustrated in FIGURE 8. This arrangement is appropriate where solid objects have to be packed. The packages are formed in the manner described above, with the only difference that a vertically movable slide 53 is used instead of a filling hopper to bring the articles or objects G to be packaged into the downwardly open U-shaped web 1, and that thereupon a horizontally movable slide 54 pushes the article or object G on to the web 2, which is introduced from below over the deflecting roller 19. Then, lying on the web 2, the articles G are carried along together with the webs 1 and 2 to the operating tools, and are packaged.

Similarly the articles or objects G to be packaged may be introduced in the horizontal plane from the side or vertically from above.

The device driven by an electric motor 60, FIGURE 1, which, by means of belt gearing 61 and a transmission comprising toothed gears 62, 63 and 64, drives a crank 66 through the intermediary of a gear 65, and a vertical shaft 70 by the intermediary of a spur 67 and bevel gears 68, 69.

The forward draw of the tube S is derived from the rotary movement of the crank 66, and by suitable elements is transferred to a carriage 80 to which the frame comprising the lateral bears 26 and the transverse spindles 27, is attached by means of bolts 81. The carriage 80 is mounted for vertical sliding movement in a dovetail guide 82, and is articulated to a rod 76 the other end of which is pivotally connected to a bell-crank lever 77. This bell-crank lever 77 which is pivotably supported at 78, is further connected by a coupling bar 73 with a link 71 articulated to crank 66. In order to provide a period of standstill for the heat sealing and clamping jaws in the upper and lower dead center position thereof, link 71 carries a roller 72 which is guided in a kidney-shaped groove 75 of a stationary cam 74. During the time in which the roller 72 traverses the sections of groove 75 which present only a slight curvature, the coupling bar 73 receives only a swinging movement, so that the bell-crank lever 77, resp. the carriage 80 are at rest during this period of time.

For the purpose of adjusting a predetermined length of forward draw or feed, the bell-crank lever 77 is provided with an elongated slot 78 in which a sliding block 79 articulated to the rod 76 is slidably and adjustably mounted, so that the effective lever arm of bell-crank lever 77 can be varied by displacing the block 79 in the slot 78. The elongated slot 78 is of arcuate shape so that the position of the upper dead center of the clamping and heat sealing jaws remains unchanged when the device is adjusted for different package sizes.

The horizontal movement of the clamping and heat sealing jaws 30, 40 which is transmitted by the rails 35 and 44, is controlled by cams 85, 86. These cams are arranged in gear housings 87, 88 of the machine frame 89. They are driven from the vertical shaft 70 through the intermediary of bevel gears 90, 91 and spur gears 92, 93, 94, 95, respectively 96, 97, 98, 99. Cam 85 controls the reciprocating movement of the rails 35 which are articulated to pivotally mounted bell-crank levers 100, 101 interconnected with one another by a link 102. A roller 104 supported on a lever 105 which by means of a connecting rod 106 is connected with the rails 35, is urged into engagement with the periphery of cam 85 by a spring 103. The rails 44 for the movement of the heat sealing jaws are controlled in the same manner as described above.

The heat sealing jaws 21, 22 for sealing the folded edges or margins 1', 1", which are resiliently mounted on supports 112, 113 secured to horizontally slidable bars 110, 111, are controlled by cam 86. A roller 114 which is supported on a lever 117 pivotally connected with the bar 110 through the intermediary of a connecting rod 116, is urged into engagement with the periphery of cam 86 by a spring 115.

The gear housing 88 is mounted on the machine frame 89 in mirror symmetry with gear housing 87, and contains the same drive elements for the control of the heat sealing and clamping jaws situated in the right-hand part of the device, as have already been described in connection with gear housing 87.

What we claim is:

1. A device for fabricating bag packages from at least one heat sealable web, said device comprising: a mandrel of rectangular shape, folding means operatively associated with said mandrel to fold said web thereon to provide a tube of rectangular shape having a fin-like rib at each corner, heat sealing means operatively associated with said tube to seal said ribs, feeding means operatively associated with said mandrel to grip the tube at each of said ribs and advance said tube, said feeding means including clamping jaws reciprocable with respect to said mandrel; said device further comprising transverse heat sealing means adjacent said drawing means and movable therewith for transversely sealing the tube next the lower end of said mandrel.

2. A device as claimed in claim 1, wherein the clamping jaws include faces which are longitudinally coextensive with the mandrel.

3. A device as claimed in claim 1 comprising a frame reciprocably movable with respect to said mandrel, said feeding means and heat sealing means being on said frame, and control means on said frame for selectively actuating the heat sealing means and the control means.

4. A device for fabricating bag packages from heat sealable webs, said device comprising: a mandrel, folding means operatively associated with said mandrel to form thereon an elongated tube substantially of rectangular cross-section, said tube including folded edges at the corners of the rectangle, heat sealing means operatively associated with said tube to seal said edges, clamping jaws reciprocable with respect to said mandrel for selectively engaging said edges to uniformly advance said tube longitudinally, and transverse heat sealing means adjacent said clamping jaws and movable therewith for transversely sealing the tube.

5. Packaging apparatus comprising sources of first and second webs, guiding and shaping means for guiding said webs along substantially parallel paths and for shaping said webs into a rectangular tube including corner fins arranged in substantially parallel alignment and with said webs overlapping and being juxtaposed along two of said fins, heating means for engaging and welding said fins to fix the shapes thereof and to connect said webs, transporting means for engaging said fins and displacing said tube to pull said webs along said paths, transverse sealing means for engaging said tube and transversely sealing the same into determinable lengths, means for charging said lengths with a predetermined material, and means for cutting apart the lengths of tube with said material therein.

6. Packaging apparatus comprising sources of first and second plastic webs, guiding means for guiding said webs along substantially parallel paths, shaping means for shaping said webs into a rectangular tube including corner fins arranged in substantially parallel alignment and with said webs overlapping and being juxtaposed along two of said fins, heating means for engaging and welding said fins to fix the shapes thereof and to connect said webs, transporting means for engaging said fins and displacing said tube to pull said webs along said paths, transverse sealing means for engaging said tube and transversely sealing the same into determinable lengths, means for charging said lengths with a predetermined material, and means for cutting apart the lengths of tube with said material therein; said means for charging said lengths including means to discharge said material through said shaping means into respective of said lengths.

7. Packaging apparatus comprising sources of first and second webs, guiding means for guiding said webs along substantially parallel paths, shaping means for shaping said webs into a rectangular tube including corner fins arranged in substantially parallel alignment and with said webs overlapping and being juxtaposed along two of said fins, heating means for engaging and welding said fins to fix the shapes thereof and to connect said webs, transporting means for engaging said fins and displacing said tube to pull said webs along said paths, and transverse sealing means for engaging said tube and transversely sealing the same into determinable lengths, means for charging said lengths with a predetermined material, said shaping means including an elongated flat member and a shaping plate defining therewith a space within which passes one of said webs, said shaping plate including successive portions respectively and successively of U-shape, of U-shape with diverging ribs facing said flat member, of U-shape with said ribs and further with diverging extremities, and of closed and hollow rectangular shape, and means for urging said one web against said portions; said means for charging said lengths including means to discharge said material, through the portion of said shaping plate which is of hollow rectangular shape, into respective of said lengths.

8. Packaging apparatus comprising sources of first and second plastic webs, guiding means for guiding said webs along substantially parallel paths, shaping means for shaping said webs into a rectangular tube including corner fins arranged in substantially parallel alignment and with said webs overlapping and being juxtaposed along two of said fins, heating means for engaging and welding said fins to fix the shapes thereof and to connect said webs, transporting means for engaging said fins and displacing said tube to pull said webs along said paths, transverse sealing means for engaging said tube and transversely sealing the same into determinable lengths, means for charging said lengths with a predetermined material, and means for cutting apart the lengths of tube with said material therein; said shaping means including an elongated flat member and a shaping plate defining therewith a space within which passes one of said webs, said shaping plate including successive portions respectively and successively of U-shape, of U-shape with diverging ribs facing said flat member, of U-shape with said ribs and with diverging extremities, and of closed and hollow rectangular shape, and means for urging said one web against said portions; said heating means including backing members for bracing said fins and constituting extensions of said means for urging said one web against said portions, and reciprocable heating jaws for welding said fins against said backing members; said transporting means including counter members for bracing said fins, reciprocable clamping jaws for clamping said fins against said counter members, and means for displacing said clamping jaws and counter members to displace said tube; said means for charging said lengths including means to discharge said material, through the portion of said shaping plate which is of hollow rectangular shape, into respective of said lengths.

9. A packing method comprising continuously and successively modifying the shape of an elongated flat web by folding legs from a central portion of the web to impart a U-shape to the web, forming fins extending laterally from said central portion, and outwardly bending the free extremities of said legs; juxtaposing the lateral extremities of a second web to the outwardly bent extremities; welding said fins to fix the same, welding said extremities to connect said webs to form a closed tube, the welded extremities constituting additional fins, engaging and displacing said tube through the intermediary of said fins, transversely sealing said tube at determinable positions to form separate lengths, and charging said tube successively with material for the respective lengths.

10. A method of making containers comprising continuously and successively modifying the shape of an elongated flat web by folding legs from a central portion of the web to impart a U-shape to the web, forming fins extending laterally from said central portion, and outwardly bending the free extremities of said legs; juxtaposing the lateral extremities of a second web to the outwardly bent extremities; welding said fins to fix the same, welding said extremities to connect said webs to form a closed tube, engaging and displacing said tube through the intermediary of said fins and transversely sealing said tube at determinable positions to form separate lengths.

References Cited in the file of this patent

UNITED STATES PATENTS

| 2,257,823 | Stokes | Oct. 7, 1941 |
| 2,320,326 | Avery | May 25, 1943 |
| 2,533,554 | Byerly | Dec. 12, 1950 |
| 2,762,178 | Campbell | Sept. 11, 1956 |
| 2,837,883 | Bracey | June 10, 1958 |
| 2,969,628 | Irmscher | Jan. 31, 1961 |